(12) United States Patent
Kung et al.

(10) Patent No.: US 6,574,739 B1
(45) Date of Patent: Jun. 3, 2003

(54) DYNAMIC POWER SAVING BY MONITORING CPU UTILIZATION

(75) Inventors: Shao-Tsu Kung, Taipei (TW); Chih-Chuan Cheng, Taipei (TW); Chun-Chih Liu, Taipei (TW); Yi-Chang Chen, Taipei (TW)

(73) Assignee: Compal Electronics, Inc., Neihu (TW)

( * ) Notice: Subject to any disclaimer, the term of this patent is extended or adjusted under 35 U.S.C. 154(b) by 0 days.

(21) Appl. No.: 09/550,321

(22) Filed: Apr. 14, 2000

(51) Int. Cl.[7] .................................. G06F 1/32
(52) U.S. Cl. ........................ 713/322; 713/320
(58) Field of Search ................. 713/300, 320, 713/322–340, 501

(56) References Cited

U.S. PATENT DOCUMENTS

| | | | | |
|---|---|---|---|---|
| 5,218,704 A | * | 6/1993 | Watts, Jr. et al. ............ | 713/322 |
| 5,930,516 A | * | 7/1999 | Watts, Jr. et al. ............ | 713/322 |
| 5,996,084 A | * | 11/1999 | Watts ......................... | 713/322 |
| 6,006,336 A | * | 12/1999 | Watts, Jr. et al. ............ | 713/322 |
| 6,158,012 A | * | 12/2000 | Watts, Jr. .................... | 713/322 |
| 6,173,409 B1 | * | 1/2001 | Watts, Jr. et al. ............ | 713/322 |
| 6,397,340 B2 | * | 5/2002 | Watts, Jr. et al. ............ | 713/322 |
| 6,427,211 B2 | * | 7/2002 | Watts, Jr. .................... | 713/320 |

* cited by examiner

Primary Examiner—Thomas M. Heckler
(74) Attorney, Agent, or Firm—Winston Hsu

(57) ABSTRACT

A CPU activity monitoring circuit is electrically connected to a CPU. This circuit monitors the state of a bus signal line on the CPU, as there is a strong correlation between the state of this line and the processing load of the CPU. This circuit can interrupt the processor to force an interrupt service call to a BIOS routine. This BIOS routine will adjust the internal clock frequency, or internal operating voltage, of the CPU based upon the perceived processing load of the CPU.

12 Claims, 2 Drawing Sheets

DYNAMIC POWER SAVING BY MONITORING CPU UTILIZATION

BACKGROUND OF THE INVENTION

1. Field of the Invention

The present invention relates to a method for saving power in a computer. More particularly, the present invention relates to a method for conserving power by monitoring the central processing unit (CPU) of a computer system and dynamically adjusting the internal clock frequency, or internal operating voltage, of the CPU based on a perceived CPU processing load.

2. Description of the Prior Art

In order to conserve electricity, especially in laptop computer systems, various power-saving methods are used. These may include monitor timeouts, hard disk spin downs, and the computer entering a "sleep" state after a period of inactivity. On certain processor systems, it is also possible to adjust the operating clock frequency, or internal operating voltage, of the central processing unit (CPU). When the processor runs at slower clock speeds, or lower voltages, it requires less power. As a significant amount of power is consumed by the CPU, reducing clock speeds and voltages is a reasonable strategy to extend operational time when running off a battery. For many of the most common applications, a CPU running at a reduced speed is usually sufficiently fast to not incur any inconvenience for the user.

The current method used to set the power saving modes of a computer involves accessing a power management program. This program may be accessed through a BIOS (Basic Input Output System) setup program, or through the operating system. In either case, to efficiently utilize and conserve power under various operating conditions, the user must set appropriate power-saving parameters. As most people do not enjoy adjusting such system internals, they tend to set the processor speed to its highest value and leave it at that. On laptop systems, this can cause an unnecessary loss of battery time.

SUMMARY OF THE INVENTION

It is therefore a primary objective of this invention to provide an autonomous means of monitoring the processing load of the CPU. Based upon a perceived processing load of the CPU, the internal clock frequency of the CPU is adjusted accordingly to reduce the electrical power consumed by the CPU.

The present invention, briefly summarized, calls for a monitoring circuit that is electrically connected to the CPU. This circuit monitors the state of a memory access line on the CPU, as there is a strong correlation between the state of this line and the processing load of the CPU. The monitoring circuit can interrupt the processor to force an interrupt service call to a BIOS routine. This BIOS routine will adjust the internal clock frequency and operating voltage of the CPU based upon the perceived processing load of the CPU.

By using a circuit to autonomously monitor the perceived processing load of the CPU, the internal clock frequency and operating voltage of the CPU can be adjusted to ensure that applications run as quickly as possible, while using as little energy as possible.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Many 80×86 lines of CPUs, and their related descendent generations, all have a status signal line (M/IO line) that works in conjunction with the bus address lines. The state of the M/IO line indicates whether the CPU is performing a read/write operation to memory or to an I/O port. The processor essentially has two address spaces: one for memory, and one for I/O. Although many I/O operations are memory-mapped, such as video bit planes, many others are not. These operations may include setting video card display registers, communication with disk controllers, etc.

Experimental data has shown that there is a strong correlation between the processing load of the CPU and the activity of the M/IO line. Higher processing loads set the M/IO line to a memory fetch state more frequently than lower processing loads. Consequently, by monitoring the state of the M/IO line it is possible to obtain a perceived processing load of the CPU.

Figure 1:
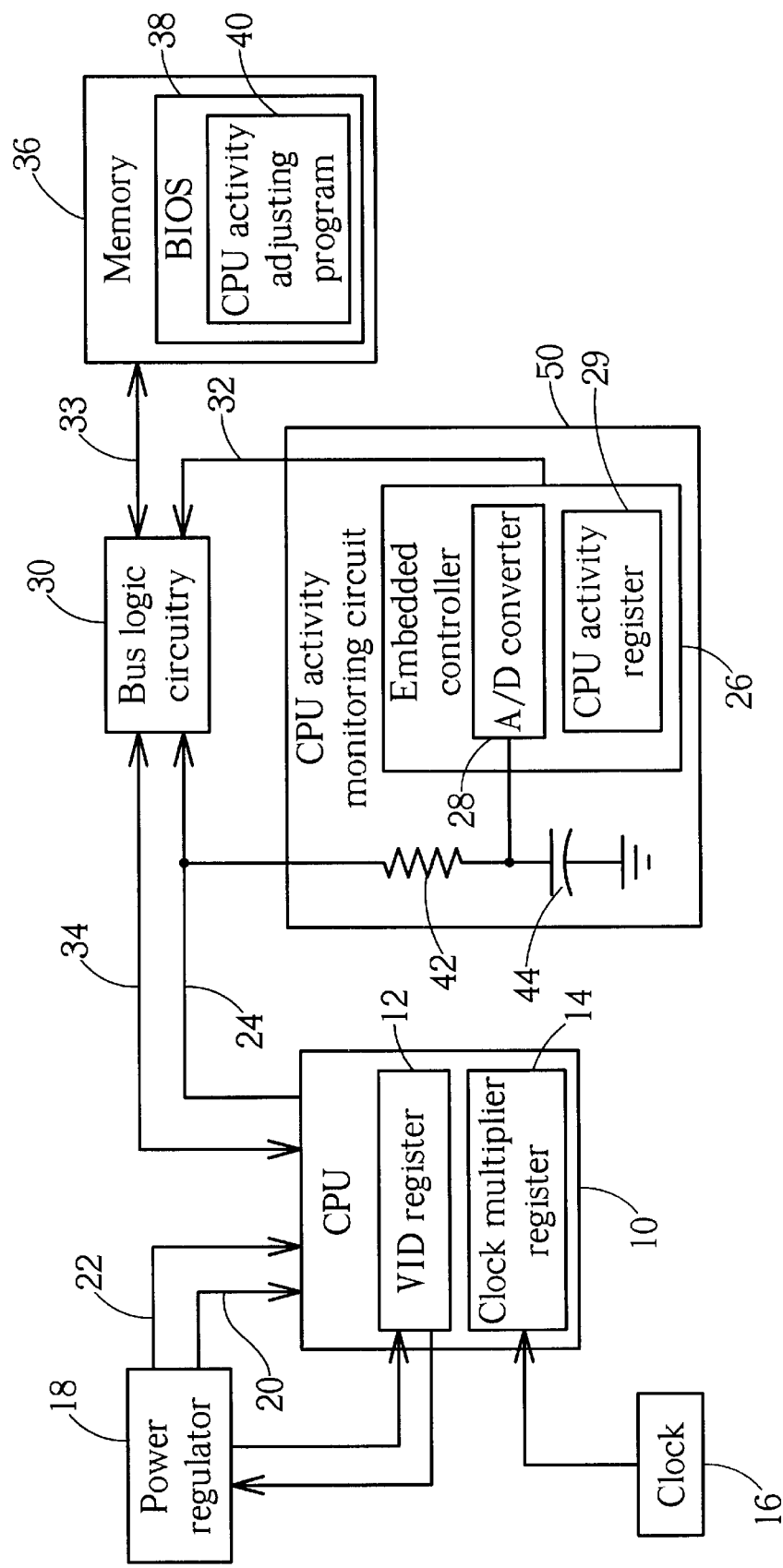
FIG. 1 is a block diagram of a preferred embodiment of the present invention.

Please refer to FIG. 1. FIG. 1 is a block diagram of a preferred embodiment of the present invention. The computer system of the present application comprises a CPU 10, a clock 16, a power regulator 18, a memory 36, a CPU activity monitoring circuit 50 and a bus logic circuitry 30.

The CPU 10 processes data or executes programs using a predetermined internal clock frequency. The clock 16 provides a fixed frequency to the CPU 10 for generating the required internal clock frequency. The power regulator 18 provides a required input voltage to the CPU 10. The memory 36 is used for storing data and programs. The CPU activity monitoring circuit 50 is used for monitoring processing loads of the CPU 10, and generates a load parameter that corresponds to a perceived processing load of the CPU 10. The bus logic circuitry 30 builds up communication link between the CPU 10 and the memory 36, the CPU activity monitoring circuit 50. Inside the memory 36, there is a CPU activity adjusting program 40 for adjusting the internal clock frequency and operating voltage of the CPU 10 according to the load parameter. The elements of the present computer system are introduced in detail in the following.

The preferred embodiment considers a CPU such as AMD's K6-2+ processor, or its equivalent, which has built-in functionality for operating voltage of the CPU. Such a CPU 10 comprises a clock multiplier register 14 and a voltage identification (VID) register 12, amongst a plurality of other registers.

A clock 16 is electrically connected to the CPU 10. The clock 16 provides a fixed frequency to the CPU 10. The frequency of the clock 16 is multiplied by the multiplier value stored in the clock multiplier register 14 to provide the internal clock frequency of the CPU 10. Hence, by changing the multiplier value stored in its clock multiplier register 14, the CPU can change its internal clock frequency.

The power regulator 18 provides power to the CPU 10 via a CPU I/O voltage line 20 and a CPU core voltage line 22. The CPU I/O voltage line 20 is of a fixed voltage, and is the voltage the CPU 10 uses to communicate with external circuitry. The CPU core voltage line 22 provides one of a plurality of selectable voltages, which is the voltage used internally by the CPU 10. The selectable voltages lie within a range of voltages that the CPU 10 can accept. The voltage provided on the CPU core voltage line 22 is controlled by the VID register 12 of the CPU 10. Specifically, the VID register 12 is electrically connected to the power regulator 18, and the power regulator 18 provides the required input voltage to the CPU 10 according to a VID value stored therein. By changing the VID value in the VID register 12, the voltage provided on the CPU core voltage line 22 is correspondingly changed. The power regulator 18 also has an input that is electrically connected to the VID register 12.

When operating at a high internal clock frequency, the CPU 10 requires a relatively high voltage. When operating at lower clock frequencies, the CPU 10 can use lower voltages, thereby using less energy. Consequently, to conserve energy during periods of little processor activity, the multiplier value stored in the clock multiplier register 14 is first reduced to lower the CPU internal clock frequency. Then, the VID value stored in the VID register 12 is changed to one that selects an appropriately lower voltage from the power regulator 18. The instruction set of the CPU activity adjusting program 40 executed in the CPU 10 provides instructions to change the contents of the clock multiplier register 14 and the VID register 12.

The CPU 10 further comprises a plurality of bus logic lines 34 electrically connected to bus logic circuitry 30. In particular, a M/IO signal line 24 is electrically connected to the bus logic circuitry 30. As discussed above, this line is held in one state when the processor is performing a memory operation, and is held in another state when performing an I/O operation. The M/IO signal line 24 is also electrically connected to a resistor 42 of a CPU activity monitoring circuit 50 of the present invention, so that the CPU activity monitoring circuit 50 can monitor the present processing load of the CPU 10 via the M/IO signal line 24.

The CPU activity monitoring circuit 50 comprises a RC circuit and an embedded controller 26. The RC circuit includes the resistor 42 and a capacitor 44 in series with ground. The embedded controller 26 includes an A/D converter 28 and a CPU activity register 29, and is electrically connected between the resistor 42 and the capacitor 44. The simple series resistor-capacitor circuit of the CPU activity monitoring circuit 50 essentially averages over a predetermined period of time the state of the M/IO signal line 24, and then develops an analog voltage accordingly. The specific length of time is determined by the value of the resistance and capacitance used for the resistor and capacitor, respectively. It is suggested that a period of 10 msec (milliseconds) to 100 msec be used. In the preferred embodiment, the value of the resistor 42 is 500 kΩ (kilo-ohms), and the value of the capacitor 44 is 0.1 $\mu$F (microfarads), together corresponding to a period of 50 msec.

The developed analog voltage of the M/IO 24 is fed into the A/D converter 28 of the embedded controller 26. The embedded controller 26 contains circuitry to perform logical operations on the value obtained from the A/D converter 28 and place a load parameter into a CPU activity register 29. This load parameter represents the perceived processing load of the CPU 10 based upon the M/IO signal line 24.

The embedded controller 26 also comprises an interrupt line 32 that is electrically connected to the bus logic circuitry 30. Using the interrupt line 32, the CPU activity monitoring circuit 50 can interrupt the normal program flow of the CPU 10. The memory 36 is electrically connected to the bus logic circuitry 30, and contains program code and data of the CPU 10. In particular, it holds Basic Input Output System (BIOS) code, and part of this code comprises a CPU activity adjusting program 40. When interrupted by the CPU activity monitoring circuit 50, the CPU 10 begins executing the CPU activity adjusting program 40.

The CPU activity adjusting program 40 inspects the contents of the CPU activity register 29. As the load parameter of this register represents the perceived processing load of the CPU 10 over a recent period of time, the CPU activity adjusting program 40 may increase or decrease the internal clock frequency of the CPU 10. For example, if the CPU activity register 29 indicates an increase in the perceived processing load, the CPU activity adjusting program 40 may adjust the VID register 12 for a higher voltage on the core voltage line 22 from the power regulator 18, and then increase the multiplier value of the clock multiplier register 14 to increase the internal clock frequency of the CPU 10. Similarly, if the perceived processing load appears to be going down, the CPU activity adjusting program 40 may reduce the multiplier value of the clock multiplier register 14, and then use the VID register 12 to request a lower voltage from the power regulator 18. In this manner, the power consumption of the CPU 10 will fluctuate with the perceived processing demands placed upon the CPU 10.

Figure 2:
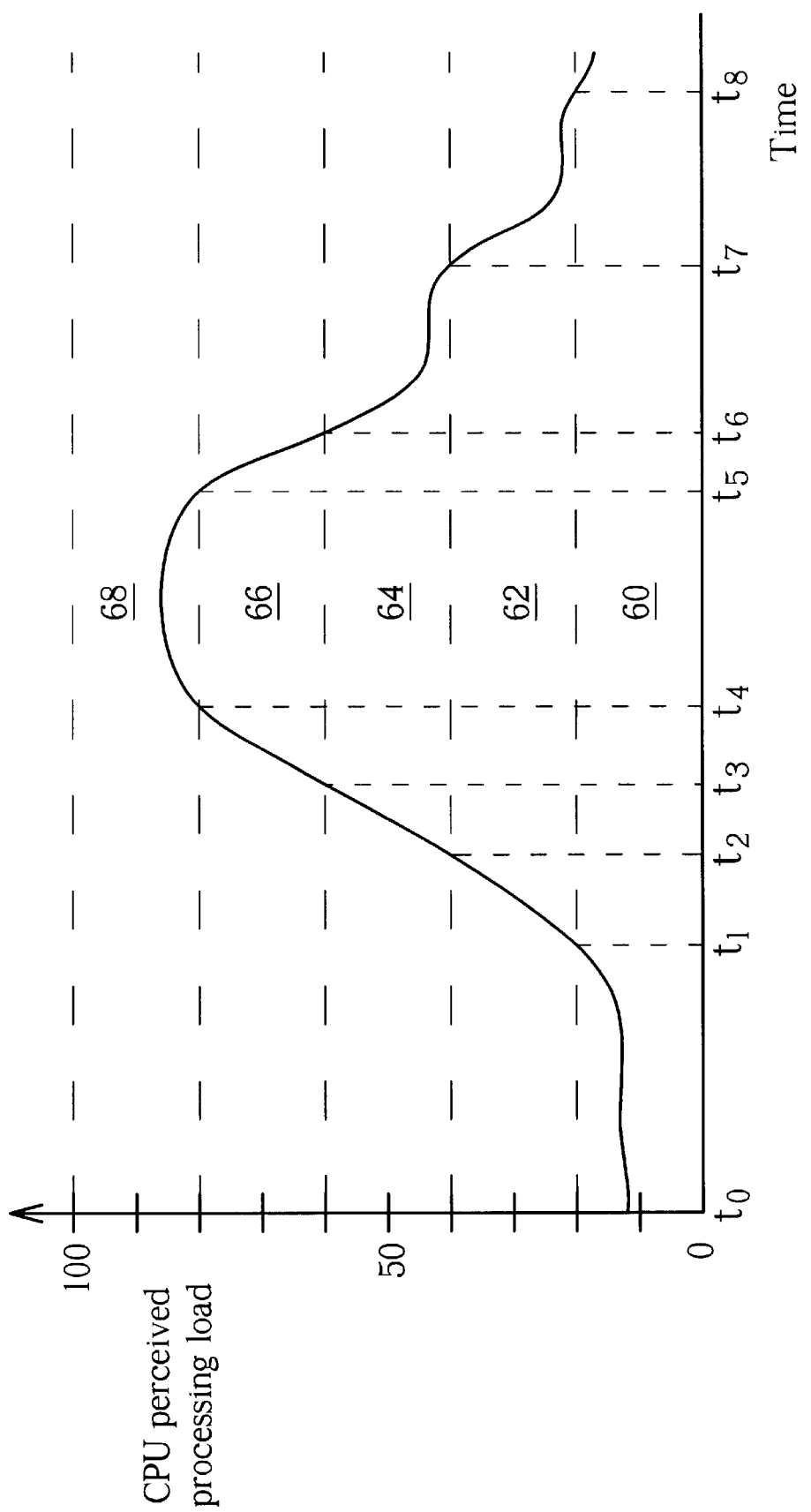
FIG. 2 is a hypothetical graph of perceived processing load versus time.

Various methods may be used to determine when the CPU activity monitoring circuit 50 should strobe the interrupt line 32 to interrupt the CPU 10. A simple method might involve using a timer to interrupt the CPU 10 at regular intervals to inspect the contents of the CPU activity register 29. The preferred embodiment, however, interrupts the CPU 10 when the perceived processing load crosses any of a plurality of threshold values. Please refer to FIG. 2. FIG. 2 is a hypothetical graph of perceived processing load versus time. It is assumed that the embedded controller 26 has scaled the values obtained from the A/D converter 28 so that the values lie within a range of zero to 100. A perceived processing load value of zero represents a minimal amount of processor load, whereas a value of 100 represents a heavily loaded processor.

The graph of FIG. 2 is broken up into a series of bands, 60 to 68. The bands lie between a plurality of predefined threshold values, marked by horizontal dotted lines. The band 60 represents a region of minimal perceived processing load upon the CPU 10. The band 68 represents a region of maximum perceived processing load upon the CPU 10. Bands 62, 64, and 66 represent sequentially increasing loads.

Within each band 60 to 68, the CPU activity adjusting program 40 will choose values for the clock multiplier register 14 and the VID register 12 that most adequately fit the perceived processing load placed upon the CPU. Consequently, within band 60, a minimal voltage and internal clock frequency will be used. Within band 68, a maximum internal clock frequency, with a correspondingly high voltage, will be selected. Appropriate sliding scale values are used within the bands 62, 64, and 66.

Consider the hypothetical graph of FIG. 2. Beginning at to, the perceived processing load of the CPU 10 lies in band 60, and hence the CPU is running at it lowest possible internal clock speed and voltage. At $t_1$, the perceived processing load crosses a threshold line into band 62. The embedded controller 26 strobes the interrupt line 32 to force a call to the CPU activity adjusting program 40. Upon servicing of the interrupt, the CPU activity adjusting program 40 reads the CPU activity register 29, determines that the perceived processing load lies within band 62 and fills the clock multiplier register 14 and the VID register 12 with appropriate values. These values will slightly boost the internal clock frequency of the CPU 10, and the voltage of the core voltage line 22, if necessary.

This process is repeated at times $t_2$ and $t_3$, with the CPU running at progressively higher internal clock frequencies and voltages. At $t_4$, the adjusting program places the CPU 10 into its fastest mode of operation, i.e., with its highest internal clock frequency and an appropriately high voltage from the power regulator 18. The process occurs in reverse from $t_5$, $t_6$, and $t_7$, with the CPU 10 being placed into progressively slower modes of operation, and correspondingly lower voltages. At $t_8$, the CPU 10 is again using its slowest internal clock frequency, and lowest possible operating voltage.

It should be clear from the above discussion that the method described does not require five bands, and their corresponding modes of operation, for the CPU 10. A greater or lesser number of bands may be employed, the actual number depending upon the hardware restrictions of the CPU 10. That is, a CPU that permits a greater range of internal clock frequencies would permit the graph of FIG. 2 to be broken up into more than just five bands. On the other hand, a processor that permitted only two values to choose from for its internal clock frequency would necessitate a division of the graph into just two bands.

Furthermore, it should be noted that although the preferred embodiment employs a register that comprises the clock multiplier register 14 and the VID register 12, the method according to the present invention is not limited to such processors. For example, the CPU 10 may communicate with the power regulator 18 via an I/O port address, or a memory address. Similarly, the clock 16, having a fixed frequency, could be replaced by one that has a variable, selectable frequency. The CPU 10 could use I/O ports or memory addresses to change the frequency delivered to it by such a clock.

The preferred embodiment uses a series resistor-capacitor circuit in the CPU activity monitoring circuit 50 to provide an analog time averaging of the M/IO signal line 24. However, relatively more complicated circuits could be employed instead. For example, a digital circuit comprising a counter and timer could count over a preset period the number of times the M/IO line is strobed for memory access, and this value could be used to fill the CPU activity register 29.

Although the preferred embodiment of the present invention utilizes the M/IO signal line of the CPU 10, it should be noted the invention is not limited to such a signal line. Indeed, some processors may not even have an M/IO signal line. Nevertheless, an equally useful signal line for such processors may be found and used in a manner consistent with the present invention. It is also possible that on processors with an M/IO signal line, or an equivalent, other signal lines could also be used, or even combinations of signal lines, which can also provide a perceived processing load of the CPU.

In contrast to the prior art, the present invention utilizes a CPU activity monitoring circuit and an adjusting program to obtain a perceived processing load of the CPU. Both the processor speed and its internal voltage are then matched with the perceived processing load, hereby minimizing the power consumed by the CPU while maximizing performance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:

a central processing unit (CPU) for processing data or executing programs using a predetermined internal clock frequency, the CPU being able to accept a predetermined range of input voltages and the CPU being able to change its internal clock frequency;

a power regulator electrically connected to the CPU, the power regulator selectably providing a required input voltage to the CPU;

memory electrically connected to the CPU for storing data and programs, the memory comprising a CPU activity adjusting program being executed in the CPU;

a CPU activity monitoring circuit electrically connected to the CPU for monitoring processing loads of the CPU, the CPU activity monitoring circuit comprising a CPU activity register for storing a load parameter that corresponds to a perceived processing load of the CPU;

wherein the adjusting program adjusts the power regulator to change the input voltage of the CPU, or to change the internal clock frequency of the CPU, according to the load parameter stored in the CPU activity register.

2. The computer system of claim 1 wherein the CPU comprises a M/IO signal line, a strobed frequency of the M/IO signal line representing a correspondingly perceived load of the CPU, and the CPU activity monitoring circuit is electrically connected to the M/IO signal line, the CPU activity monitoring circuit using the M/IO signal line to determine the perceived processing load of the CPU.

3. The computer system of claim 2 wherein the CPU activity monitoring circuit accumulates over a predetermined period of time the strobed frequency of the M/IO signal line and stores accumulated results as the load parameter in the CPU activity register.

4. The computer system of claim 3 wherein the CPU activity monitoring circuit comprises a series resistor-capacitor circuit (RC circuit) electrically connected to the M/IO signal line and an analog-to digital (A/D) converter electrically connected to the RC circuit; wherein the RC circuit develops an analog voltage according to the strobed frequency of the M/IO signal line and then the analog voltage is converted into the load parameter stored in the CPU activity register.

5. The computer system of claim 1 wherein the memory comprises a Basic Input Output System (BIOS) program, and the CPU activity adjusting program is part of the BIOS program.

6. The computer system of claim 1 wherein the CPU activity monitoring circuit interrupts the CPU when the perceived load of the CPU crosses at least a predetermined threshold value, and the CPU executes the CPU activity adjusting program when it services the interrupt.

7. The computer system of claim 1 further comprising a clock with a predetermined frequency electrically connected to the CPU, and the CPU comprising a clock multiplier register with a multiplier value stored therein, the internal clock frequency of the CPU being determined by the product of the frequency of the clock and the multiplier value stored in the clock multiplier register.

8. The computer system of claim 7 wherein the CPU activity adjusting program changes the internal clock frequency of the CPU by changing the multiplier value stored in the clock multiplier register.

9. The computer system of claim 1 wherein the required input voltage to the CPU from the power regulator is selectable from a plurality of predetermined voltages.

10. The computer system of claim 9 wherein the plurality of predetermined voltages lie within the predetermined range of input voltages accepted by the CPU.

11. The computer system of claim 1 wherein the CPU comprises a voltage identification register (VID register) with a VID value stored therein, the VID) register being electrically connected to the power regulator, and the power regulator provides the required input voltage to the CPU according to the VID value sent from VID register.

12. The computer system of claim 11 wherein the CPU activity adjusting program adjusts the power regulator to change the input voltage of the CPU by changing the VID value stored in the VID register.

* * * * *